Sept. 30, 1941. F. R. ARCHIBALD 2,257,710
TREATMENT OF METALLURGICAL DUSTS CONTAINING ARSENIC
Filed May 8, 1940
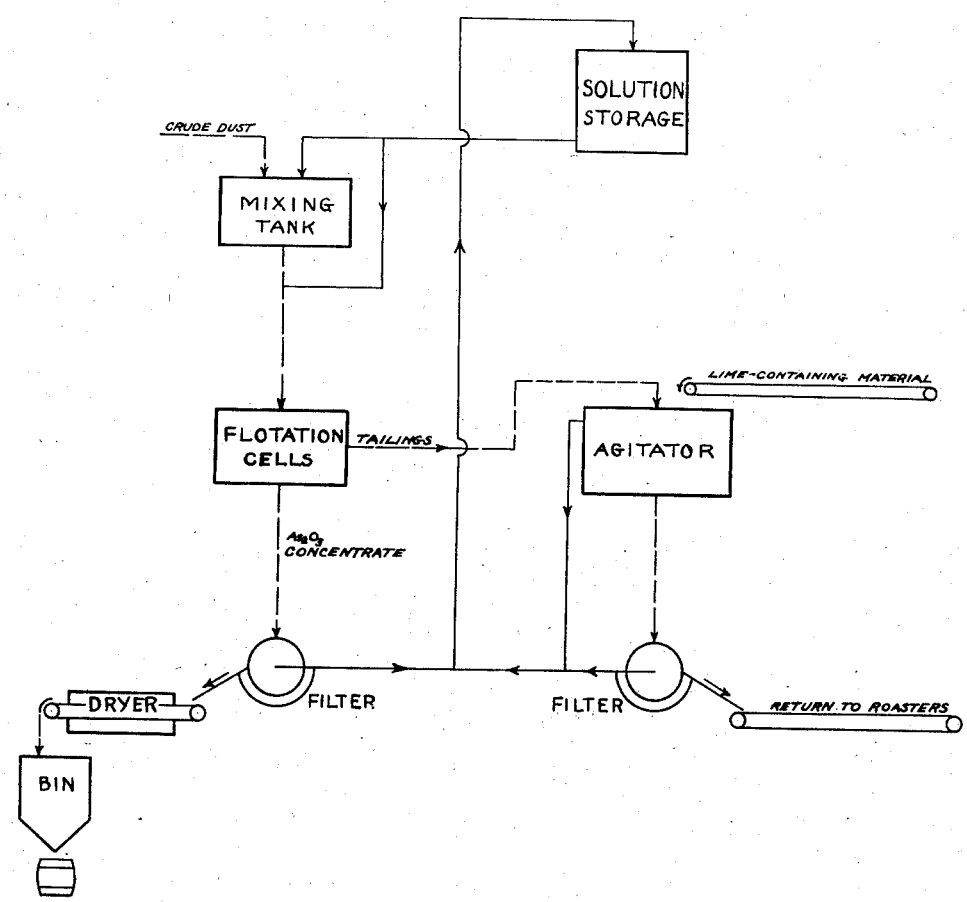
INVENTOR:
FREDERICK R. ARCHIBALD
BY Alex. E. MacRae
ATTORNEY.

Patented Sept. 30, 1941

2,257,710

UNITED STATES PATENT OFFICE 2,257,710

TREATMENT OF METALLURGICAL DUSTS CONTAINING ARSENIC

Frederick Ratcliffe Archibald, Duparquet, Quebec, Canada, assignor to Beattie Gold Mines (Quebec) Limited, Duparquet, Quebec, Canada Application May 8, 1940, Serial No. 333,941

9 Claims. (Cl. 209—166)

This invention relates to the recovery of arsenious oxide ($As_2O_3$) in relatively pure form, and particularly to a convenient and economical method of recovering $As_2O_3$ in marketable form from dust collected in roasting, smelting or other like metallurgical operations.

The usual procedure of treating dust-containing gases is to collect the dust by the Cottrell or other system. Units are maintained at temperatures adapted to the materials to be collected. In collecting arsenic the gases are cooled to a temperature of 250–300° F. This procedure offers difficulties in recovering arsenic. The separation is not complete. There is overlapping of the stages and impurities remaining in the arsenic fraction make purification necessary where a substantially pure arsenious oxide is required.

The object of the present invention is to provide for more complete recovery of arsenious oxide from furnace gases, so as to avoid its escape with the gases to the atmosphere with the attendant danger to animal and plant life, and at the same time to insure a larger recovery of the arsenic in a marketable form. Another object is to provide a method which will permit the use of the whole dust collection system for the accumulation of the arsenic in the dust recovered from the furnace gases. A further object is to provide a method for concentrating the arsenic in such dusts in substantially pure form, wherein the dust is employed to provide a reagent which, in aqueous solution, causes the arsenious oxide to float and wherein the reagent may be returned to the circuit for reuse. The invention contemplates use of the complete dust collection system for collecting the arsenic, thus providing a composite dust from which the arsenious oxide may be recovered in substantially pure form.

Before the furnace gases enter the dust collection system their temperature is reduced, by the introduction of air or preferably water in the form of a spray, to say 250 to 300° F., and the cooled gases are then passed through the successive units of the dust collecting system. This increases the efficiency of the removal of arsenic from the gases. As illustrative of the composition of dust of the character in question the following is given,—$As_2O_3$ 83.0%, $SO_3$ 5.87%, $Fe_2O_3$ 2.49% and CaO 0.59% with an insoluble portion. Obviously the composition of the dust may vary within wide limits.

The dust is then subjected to a flotation operation in any desired type of froth flotation cell. In the initial stage it is best to incorporate a small portion of ordinary coal oil or kerosene in the water with which the dust is agitated. This insures flotation of the arsenic in this stage, but as the aqueous solution becomes more or less concentrated with $As_2O_3$ and $SO_3$ the kerosene is unnecessary. During reuse the treating solution becomes substantially saturated with $As_2O_3$ and substantial $SO_3$ and some iron go into solution. This solution constitutes the flotation reagent. In order to avoid excessive accumulation of sulphuric acid in the solution, the latter is treated as required with lime or the like. Any convenient mill product containing calcite may be used. The cyclic solution may contain 6% $H_2SO_4$. In cases where the dusts do not provide the solution with sulphuric acid it may be added as such.

The operation of the method is illustrated in the accompanying drawing which shows a flow sheet.

In cyclic operation the dust from the Cottrell precipitators or other separators is mixed with the aqueous solution containing arsenic and passed through the flotation cells. The concentrates are filtered and the filter cake may be washed then dried for shipment. The amount of wash water used will be governed by that lost in the filter cake and necessary to maintain the circulating reagent. The arsenic concentrate may be shipped without drying if desired. The tailings from the flotation cells are treated with a suitable acid-neutralizing agent, to reduce the $H_2SO_4$ content to, for example, about 6%, and filtered. The residue is returned to the roaster or smelter if it contains useful products, as for example if a lime-containing mill concentrate is used to neutralize the excess acid in the solution. The filtrates are returned to the solution storage tank for recirculation.

The following illustrate results obtained:

(1) Using as treating agent a solution prepared by agitating a dust with water and a small amount of coal oil, 390 grams of cold dust from a Cottrell precipitator were passed in two lots through a flotation cell. The results were as follows:

| | Weight | Percent $As_2O_3$ |
|---|---|---|
| Heads | 390 | 83.0 |
| Concentrate | 255 | 95.0 |
| Filtrate | 5700 | 1.275 |
| Tailings | 10 | 4.95 |

The concentrate was retreated with the filtrate and the recleaned concentrate contained 96.0% $As_2O_3$. After the solution has been reused several times no addition of coal oil or other agent is necessary.

(2) 250 grams of dust were treated with a solution as above and further portions of equal amount were successively treated with the filtrate from the previous run with the following results:

| Test | Wt. heads | Wt. conct. | Analysis conct. percent $As_2O_3$ |
|---|---|---|---|
| A | 250 | 195 | 95.0 |
| B | 250 | 200 | 95.0 |
| C | 250 | 205 | 95.0 |
| D | 250 | 210 | 95.0 |
| E | 250 | 215 | 95.0 |
| F | 250 | 220 | 95.0 |
| G | 250 | 220 | 95.0 |
| H | 250 | 225 | 95.0 |
| I | 250 | 225 | 95.0 |
| J | 250 | 225 | 95.0 |
| K | 250 | 225 | 95.8 |
| M | 250 | 225 | 95.1 |

The solution following the twelfth cycle contained in grams per litre 16.5 $As_2O_3$, 27.2 total $SO_3$, 1.80 CaO and 3.64 Fe. After treating this solution with lime-containing tailings it contained in grams per litre $As_2O_3$ 8.5, CaO 0.9, total $SO_3$ 4.25 and Fe 1.36.

(3) Without the use of coal oil 6000 grams of cold Cottrell dust were agitated with water until the solution contained substantially 6% $H_2SO_4$ and this solution gave a concentrate containing 96.5% $As_2O_3$. The filtrate contained 23.4 grams per litre of $As_2O_3$ and after treatment with a lime-containing concentrate contained 8.5 grams per litre of $As_2O_3$ and 9.3 grams per litre of $H_2SO_4$.

The cyclic use of the treating solution avoids loss of $As_2O_3$ and the purity of the final product may be substantially increased by retreatment. The return of the flotation tailings to the roaster avoids loss therein and when a normal mill product is employed for removing sulphate from the solution no extra load is imposed on the mill operation.

I claim:

1. A method of treating metallurgical dust containing $SO_3$ and arsenic oxide for the recovery of the latter in substantially pure form which comprises subjecting the dust to a froth flotation operation in the presence of a solution formed by agitating such dust in the presence of water.

2. A method of treating metallurgical dust containing $SO_3$ arsenic oxide which comprises agitating such dust in the presence of water to form a flotation reagent and subjecting the dust with said reagent to a froth flotation operation to float and concentrate the arsenic oxide therein.

3. A method as set forth in claim 2 wherein the dust is agitated in the presence of water and coal oil to form the flotation agent.

4. A method of concentrating the arsenic oxide in metallurgical dusts containing it which comprises passing the dust through a froth flotation cell with an aqueous solution containing arsenic oxide and sulphuric acid to float the $As_2O_3$ and recovering the concentrate.

5. A cyclic method for recovering arsenic oxide in substantially pure form from metallurgical dusts containing $SO_3$ and arsenic oxide which comprises mixing the dust with a solution containing arsenic oxide, passing the mixture through a froth flotation cell to float the arsenic oxide, filtering the concentrate and returning the filtrate for reuse in the circuit.

6. A cyclic method for recovering substantially pure arsenic oxide from metallurgical dusts containing it and $SO_3$ which comprises mixing the dust with a solution formed by agitating such dust with water, passing the mixture through a froth flotation cell to float concentrated arsenic oxide, removing the solution from the concentrate, treating the solution to reduce its acidity and returning the solution to the circuit.

7. A method as set forth in claim 6 wherein the dust is initially agitated with water and coal oil to form the flotation agent.

8. A closed cyclic method for treating metallurgical dusts containing $SO_3$ and a substantial proportion of arsenic oxide which comprises agitating dust with water to form a flotation agent, subjecting dust to treatment in a froth flotation cell with said agent to float and concentrate the arsenic oxide, filtering the concentrate, treating the filtrate with lime-containing material and returning the treated filtrate to the circuit.

9. A method as set forth in claim 6 wherein sulphuric acid is added to the solution formed by agitating the dust with water.

FREDERICK RATCLIFFE ARCHIBALD.